United States Patent [19]
Rath

[11] 4,003,728
[45] Jan. 18, 1977

[54] METHOD AND APPARATUS FOR CONTROLLING THE STORAGE CONDITION OF PERISHABLE COMMODITIES IN LONG-DISTANCE TRANSPORT VEHICLES

[76] Inventor: Eric Rath, 2415 Calle Del Oro, La Jolla, Calif. 92037

[22] Filed: Oct. 9, 1974

[21] Appl. No.: 513,275

[52] U.S. Cl. ............................. 62/78; 62/176 R; 62/211; 165/3
[51] Int. Cl.² ......................................... F24F 3/16
[58] Field of Search ............... 165/1, 2, 3; 62/211, 62/418, 176, 78

[56] References Cited
UNITED STATES PATENTS

| | | | |
|---|---|---|---|
| 2,053,042 | 9/1936 | Otto | 62/211 |
| 2,095,780 | 10/1937 | Willat | 62/78 |
| 2,130,430 | 9/1938 | Maginnis | 62/176 |
| 2,195,781 | 4/1940 | Newton | 62/176 |
| 2,506,448 | 5/1950 | Gregor | 62/176 |
| 2,780,923 | 2/1957 | Jones | 62/78 |
| 2,904,254 | 9/1959 | Bahnson | 62/176 |
| 3,088,290 | 5/1963 | Zearfoss | 62/78 |
| 3,132,012 | 5/1964 | Walker | 62/78 |
| 3,521,459 | 7/1970 | Rath | 62/85 |

*Primary Examiner*—Charles J. Myhre
*Assistant Examiner*—Daniel J. O'Connor
*Attorney, Agent, or Firm*—Kleinberg, Morganstern, Scholnick & Mann

[57] ABSTRACT

A method and apparatus for transporting perishable commodities provides recirculation of moisture saturated air at a predetermined optimum storage temperature through the cargo from bottom to top of individual van containers. Temperature sensors are provided in each container and, if possible inside the commodity itself to enable monitoring of the conditions of storage by remote recorders. A central station powers the containers and maintains records for all containers of selected storage parameters such as temperature and humidity.

12 Claims, 11 Drawing Figures

METHOD AND APPARATUS FOR CONTROLLING THE STORAGE CONDITION OF PERISHABLE COMMODITIES IN LONG-DISTANCE TRANSPORT VEHICLES

BACKGROUND OF THE INVENTION

1. Field of the Invention

The present invention relates to transportation of fresh perishables and, more particularly, deals with an effort to utilize balanced mass transfer in transportable containers for fresh foods such as fruits, chilled meats, vegetables, and the like.

Major containers, sometimes known as van containers, transporting numerous crates or other packages of such fresh foods can have conditions of relative humidity and appropriate temperature controlled correctly and properly, with appropriate conditions of the combined simultaneous transfer of heat and mass within said unit. The optimum storage condition is one in which the combined heat and vapor is pressurized and balanced between the internal mass of vapor of the internal space of the product and the activated airstream coming in contact with it.

2. Description of the Prior Art

There have been many devices for shipment of fresh foods to maintain them in a continued fresh condition. Each of these devices has had its limitations. For example, my prior invention, U.S. Pat. No. 3,521,459, reissued as U.S. Pat. No. 27,457, although an extreme advance in the art, did not fully recognize all of the problems or suggest the solution present in some of the aspects of the present invention. Some of the new treatment and control methods and apparatus disclosed in this application are of unusual interest and value.

Thus, there is no real "prior art" in the exact field of "balanced mass transfer" between cargo and internal airstream for cargo cooling in the container, as is needed in today's shipping. The balanced, minimal heat and mass transfer process for fresh, heat-producing produce in a novel cooling system and is the object of this invention.

SUMMARY OF THE INVENTION

The transportation of fresh foods of all types has become, and is becoming, more and more wide spread. Such transport methods utilize air, sea, and land transport, with large containers of the type generally known as van containers. The problem of maintaining properly continued treatment in transit with correct temperature and humidity has become much more important. Frequently, there are large shipments of such foods by water. In such cases, it is often necessary that large refrigeration plants be provided to maintain adequate cooling of foods being shipped.

In all conventional refrigeration systems, dry air passes through a refrigeration unit and continues to circulate about the products being shipped. This is not an effective control of humidity, since the cooling coil removes the water vapor out of the product by dehydration and causes deterioration and dessication of the fresh, highly sensitive foods being shipped.

The problem is compounded since, upon recirculation, more and more moisture is removed! In my prior inventions, there was a considerable improvement in this important field. The present invention achieves perfect balance mass transfer and provides a novel method relating to temperature management, so as to reduce the usual hazards of senescence of the product in transit.

I have discovered and developed a method which is the opposite of that usually employed by others to maintain fresh food in the correct condition in a closed shipping container. In general, the prior devices in this field have relied upon passing cool, dry air from the upper portion of a load, downwardly around the load, under the assumption that the cool air would "run" down to the lower portion of the container and thereby cool the cargo. My prior U.S. Pat. No. 3,521,459, recognized the problems of that approach and rather, taught the use of a "moist" air cooling system, flowing from bottom to top of the load.

The major problems of avoiding deterioration of the product, of cycling and recycling the refrigerated air and cooling, and of excessive cooling are well known to those skilled in the art. Product spoilage through dehydration, is also a well known problem arising from the use of conventional refrigerating systems.

In the present invention, I have pursued and improved my prior approach to the maintenance of foods in the proper condition and have endeavored to prevent mass transfer of vapor between the product and the cooling coil. I have circulated the "treated"moist air, containing a saturated mixture of dry air and water vapor, under pressure to the entire load. A series of floor ducts or a floor plenum cooperates with various portions of the load into which the amount of combined air and water vapor are introduced. In effect, each perishable article may almost be considered to be an individual plenum chamber filled with vapor cooperating with the overall system to provide its own proper protection in transit, by avoiding the mass transfer of moisture from the product via the airstream to the ambient environment.

According to the present invention, cargo is initially stored in more or less standardized container modules, such as the present international standard size (40 feet Long × 8 feet Wide with heights from 8 feet to 9 feet 6 inches) cargo or van containers. Also truck bodies can be utilized as can freight cars, suitably modified. A strengthening bulkhead is provided which isolates the air treating apparatus from the cargo and supports the air mobility structure.

As an additional feature of the present invention, a plurality of individual containers can be provided as part of a single shipment, such as a multicar train or a ship carrying a plurality of individual van containers. Each container generally carries a single commodity or, alternatively, commodities within a single one of the seven "non-frozen" groups identified in Table 13-4 of my book "Container Systems", published by John Wiley.

Obviously, commodities within the same group can be carried safely by the same container. Each container includes a plenum pressure chamber floor in the storage compartment and, behind a vertical bulkhead which acts as an end wall, the heating-refrigeration system is located, together with the ducting and blowers that recirculate the moisture-laden air through the cargo. Additionally, there is a closure at the door end on the floor, which makes a floor a closed plenum, too.

According to a preferred embodiment of the present invention, the cooling and/or heating system is controlled by a pair of sensors at the intake and outlet of the air circulation and conditioning system. The temperature of delivered air and vapor controls the refrigerating effects and the temperature of the refrigeration system output controls the heat unit. If return air is too warm, the cooling system is energized. If the emerging refrigerated air is too cold, the heater is energized. A plurality of sensors including sensors in the load itself are used to monitor the status of the cargo.

In a preferred embodiment, at least two temperature sensors are placed in the interior of individual items of the commodity being transported; i.e., an individual piece of fruit or vegetable. Both of these sensors are placed in items located at a height midway between floor and ceiling along the centerline of the container, at about one-fourth and three-fourths the length of the container, respectively.

These two temperature sensors signal the actual internal temperature of the commodity being transported. In alternative embodiments, they can also be utilized to control the operation of the heater-refrigeration system as additional inputs to be considered. The state of the sensors is telemetered to a remote location where machinery adjustments can be initiated on the basis of the basis of the information thus provided.

Additionally, a third sensor can be provided to detect ambient temperature exterior to the container. This is important if the container is to be transported through an environment where the exterior temperature is below the desired, preset temperature for the load. This sensor can cause the operation of suitable heaters to maintain the interior temperature at the desired level.

A fourth, relative-humidity sensor is provided at the entrance of the subfloor plenum. This sensor, if activated, gives an alarm when the relative humidity of incoming air drops below a predetermined value, preferably 80%. Obviously, some low humidity perishables ship better at substantially lower levels and are accomodated by the present invention, as well. The presence of accumulated water in the floor ducts permits some transfer of moisture to the airstream, as taught in my prior patent.

Excess water, primarily condensate from the evaporator coils which cannot be absorbed by the airstream, in the present invention, drained from the container through the use of float operated valves. In the preferred embodiment, a float is located at each corner of the floor, and each is adjusted to keep the water level well below the level of the cargo to prevent water damage thereto.

Each container would include a heating-refrigerating air recirculating unit. As is known, these units which are electrically powered, can be powered by an internal combustion motor-generator set or can be connected to a common source of power. In a train configuration, a central control and motor car would monitor all of the containers and would provide power to operate the individual air conditioning and recirculating systems. In a container ship, similar provisions could be made. Highway systems might use either powering scheme, depending upon the length of the journey and the size of the power supply in the tractor.

Where a centralized control is provided, not only can power be supplied to the individual containers, but all sensors can be monitored to maintain a written record for each commodity container. In this way, malfunctions can be noted and corrective action taken before the contents of the container have spoiled.

One particular feature of the present invention is the provision of a funnel-shaped duct at the intake to the air treatment and recirculating portion, which pressurizes the air prior to treatment.

The substantially full width duct adjacent the bulkhead also acts as a thermal insulating barrier between the cargo compartment and the machinery in the conditioning and recirculating compartment, thereby reducing the cooling load on the conditioning equipment.

It therefore is an object of this invention to provide a method and mechanism for maintaining fresh highly sensitive food products in proper condition over extended periods of time and through different atmospheric conditions, reducing product senescence and aging.

It is a further object of this invention to provide a method and device in which temperature may be controlled by heat or cooling of the airstream so that dehydration is minimized in moisture-laden fresh products.

It is yet another object of the invention to provide a centralized control system for monitoring and powering a plurality of individual container units, each capable of storing a perishable cargo and maintaining a proper storage temperature therefor.

It is still another object of the invention to provide a centralized powering and monitoring system for use on a train or ship that permits corrective action to be taken should any one of a plurality of containers be experiencing problems by remote control.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 5c is a partial perspective view employing the floor of FIG. 5a with a perforated carton in which goods may be carried;

Figure 1:
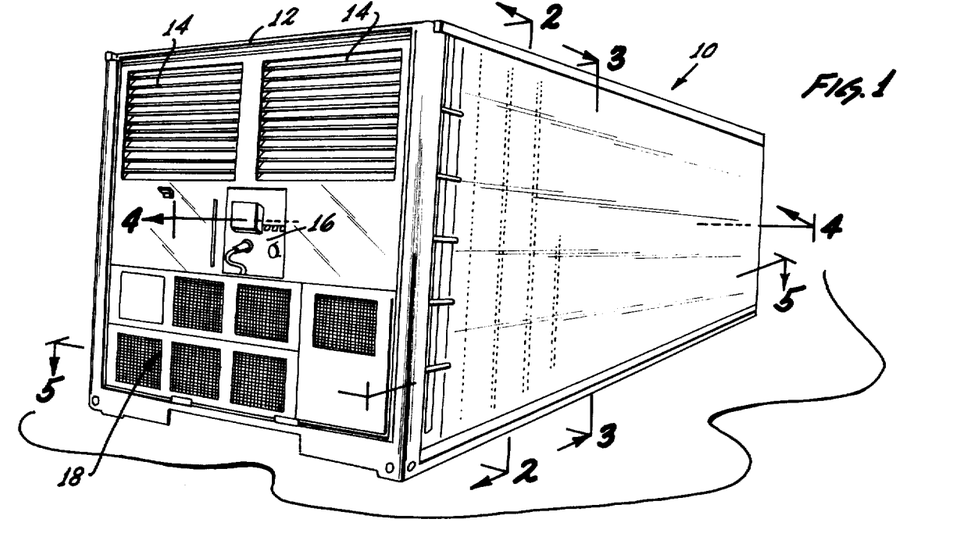
FIG. 1 is a perspective view of a typical cargo container, modified to include the apparatus of the present invention.

Turning first to FIG. 1, there is shown, in perspective, a typical international container 10 modified to transport perishable commodities in accordance with the present invention. The overall exterior appearance of the container is as is generally dictated by the international standards, including appropriate reinforcements, points of attachment for hooks, slings, etc. and the other elements required by the international standards.

As modified, according to the present invention, the container includes, in a "foward" end portion, a heating/cooling unit 12 which includes a pair of individual evaporators 14 operating in tandem, a control panel 16 and appropriate fans, evaporators, heaters, compressors, and the like, which make up a temperature control system 18.

Figures 2, 9:
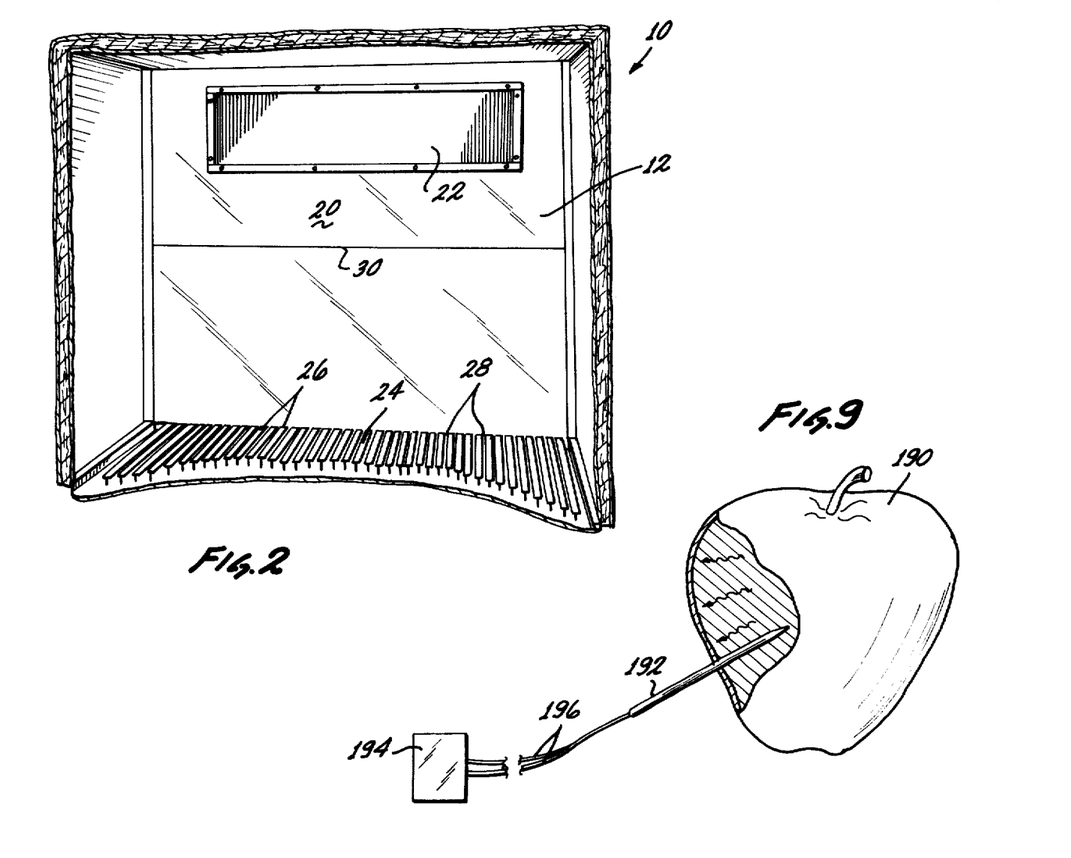
FIG. 2 is an end section view of the container of FIG. 1 taken along lines 2—2, in the direction of the appended arrows.
FIG. 9 is an illustration of a perishable commodity with a probe inserted therein.

Turning next to FIG. 2, there is shown the bulkhead 20 supplied by the present invention, for facilitating the recirculation of refrigerated air from bottom to top of the load. The interior bulkhead 20 includes a substantially full width, air intake 22, which withdraws air from the top of the container 10 and returns it, under pressure, through the floor 24 which, in the preferred embodiment, includes a plurality of T-cross-sectioned floor forming elements 26, the upper horizontal flanges of which are spaced from each other to form longitudinal slots 28. This type of floor structure was disclosed in my prior U.S. Pat. Re. No. 27,457, supra.

As shown, the lower half of the bulkhead 20 has a horizontal hinge 30 as will be explained in greater detail in connection with FIG. 4, below. The hinge 30 fulfills a dual purpose. The lower panel can be raised to give access to the air duct for cleaning and maintenance purposes. Further, the lower hinged portion also functions as a "relief valve" should the flow of air through floor ducts and channels become resrtricted for any reason, thereby avoiding the imposition of an undue load upon the blower units which pressurize the air to be conditioned and circulated.

Figures 3, 4, 5B:
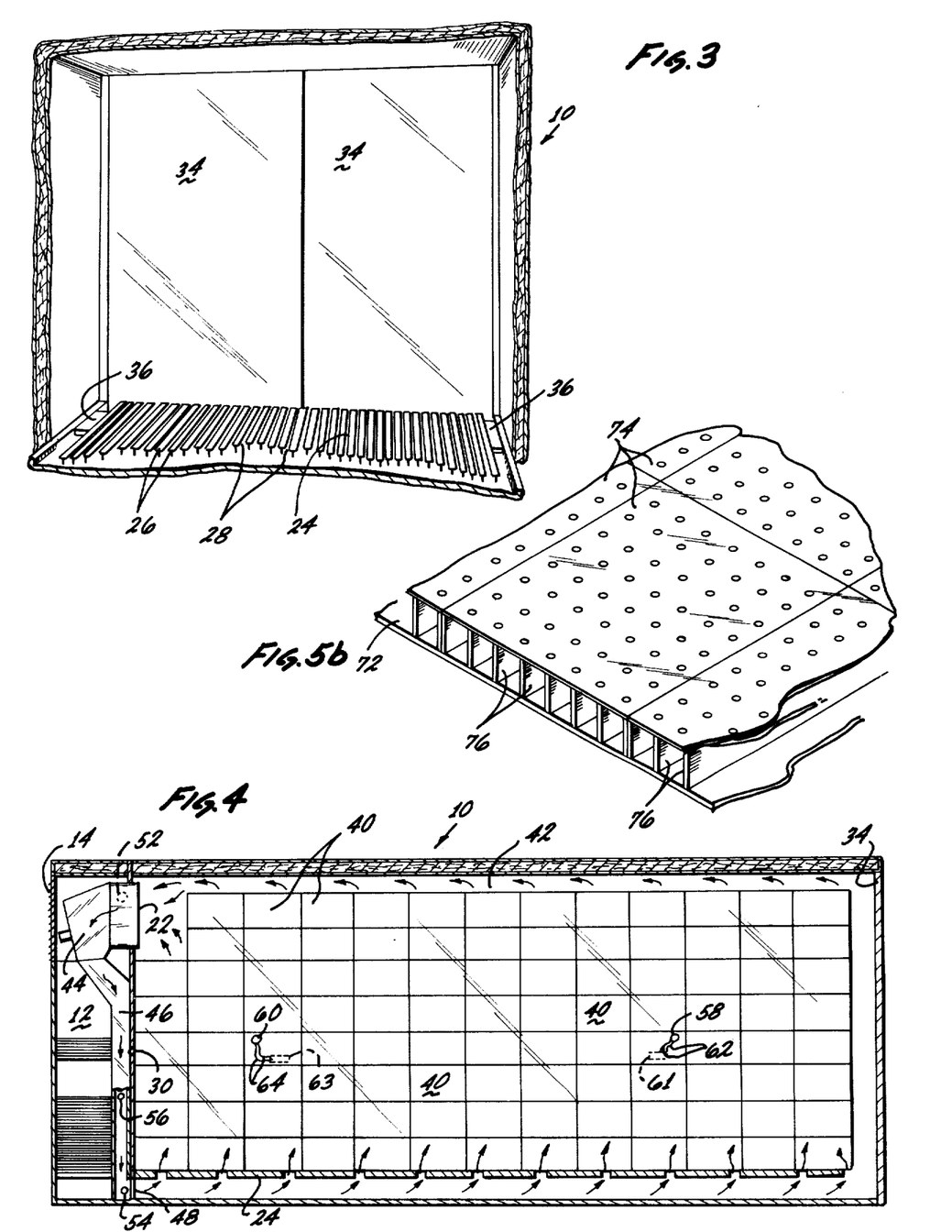
FIG. 3 is an end section of the container of FIG. 1 taken along lines 3—3, in the direction of the appended arrows.
FIG. 4 is a side section view of the container of FIG. 1 taken along lines 4—4 in the direction of the appended arrows.
FIG. 5b is a partial perspective view of an alternative structure including perforated pallets.

Turning to FIG. 3, there is shown an interior view of the container 10 looking towards the rear. A pair of full height cargo doors 34 is provided for loading the container. Also seen are float elements 38 in the floor channels, which are used to control the level of accumulated water.

FIG. 4 shows a side view of a container 10 according to the present invention, loaded with a perishable commodity which, in turn, is packaged in boxes 40 which are stacked for substantially maximum cargo loading. According to the present invention, the air intake 22 to the conditioning units is from the top of the load.

The individual boxes 40 are stacked as high as possible. Generally, some top clearance space 42 will remain which is generally adequate for the functioning of the present invention. The clearance space, in general, is equal to the height of the floor ducts created between the cargo and the lower interior "wall" surface. The air stream enters the air intake 22 and is drawn through the pair of evaporator 14 coils which are arranged to perform cooling and heating functions. A set of fans 44 draws in the air and directs it through a narrowing passage 46 to the outlet port 48 into T channels 28 and in the container floor 24.

A first sensor 52 is located in the air stream which is exhausted from the cargo area, prior to reaching the evaporator 14 coils. A second temperature sensor 54 is located in the air stream just prior to its entry into the container floor 24. A humidity sensor 56 is located adjacent to the second temperature sensor 54 so that any substantial change in humidity of the circulating air stream can be recognized and acted upon before catastrophic results take place.

Two additional temperature probes are provided in the individual containers which are located within the cargo. A first probe 58 is located along the central axis of the container approximately one-fourth of the way into the container while a second probe 60 is located along the midline at approximately three-fourths of the distance into the load. The temperature probes 58 and 60 can be provided with appropriate coupling conductors 62 and connectors 64 so that the probes 58, 60 may be plugged into appropriate outlets 62, 64 within the container body itself. Preferably, these probes are placed in intimate contact with the cargo and preferably inside an item of the cargo, at the preferred locations.

Appropriate probes can be employed to sense the interior temperature of virtually any commodity ranging from apples through oranges to pears and grapes, bananas or even avacados. Of course, some care in loading must be taken so that the conductor coupling a probe to an appropriate connector on the container wall remains intact, is not destroyed or disconnected during the loading process. The remaining cargo should be carefully placed about the sensor so as to provide a true indication of temperature conditions within the cargo.

Figures 5A, 5B:
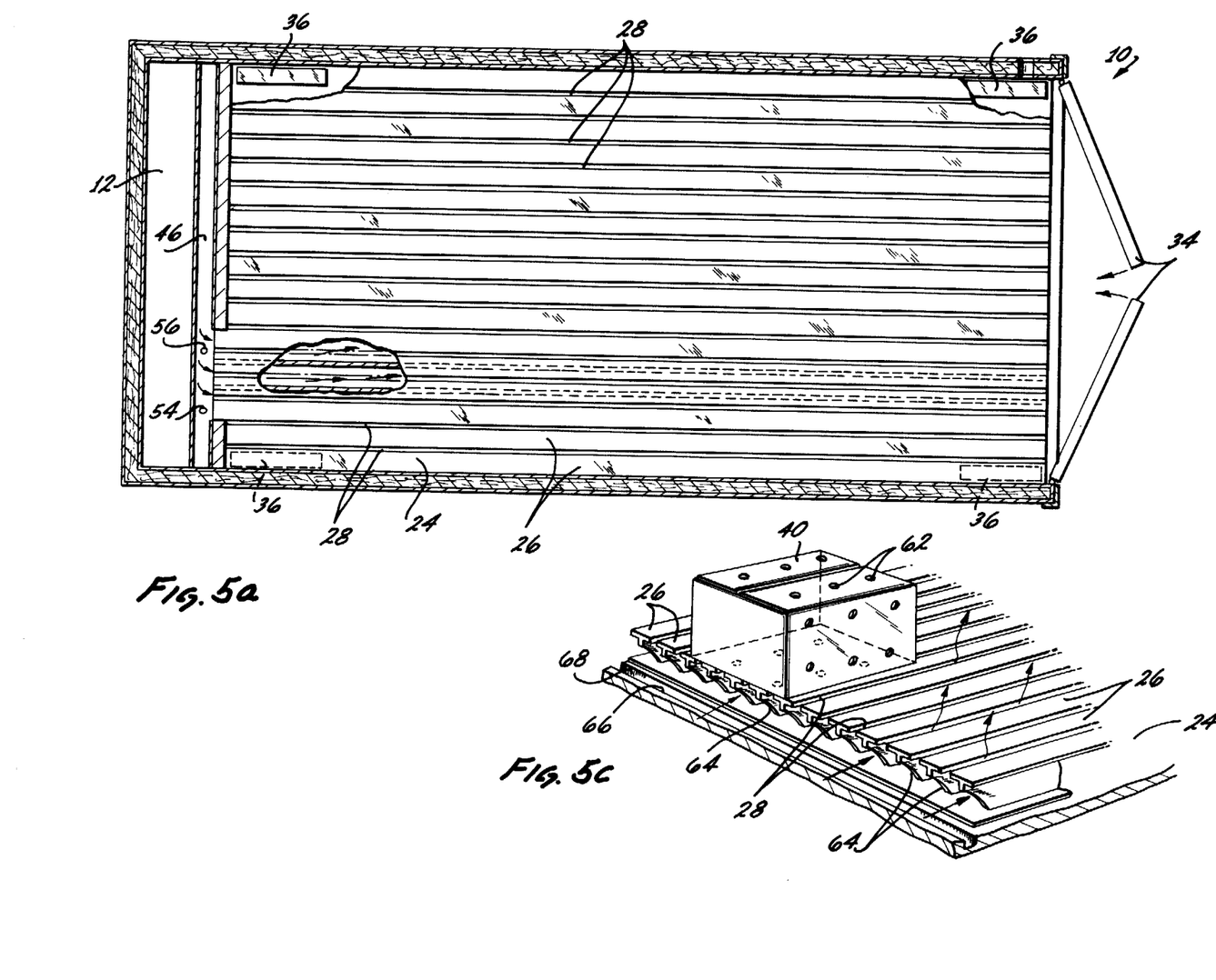
FIG. 5a is a top view of the container illustrating a floor plan of the container.

In FIG. 5a, there is shown a top view of the interior of the container, illustrating in some greater detail the float structure designed to drain excess water from the sub-floor channels. As shown, a set of four float elements 36 is provided at the four corners of the floor 24. Each of the float elements 36 is connected to a respective drain valve (not shown) which is operated by the upward movement of the float as the volume of water in the floor channels increases. Normally, a fairly then layer of water is retained in the floor to help humidify the entering, conditioned air that is to circulate upward through the cargo. For transporting most perishables, the humidity of the circulating air is kept as high as possible to reduce and retard evaporation from the interior of the product being transported. In the preferred embodiment, the relative humidity is kept at between 89% and 95%.

The valves, operated by the floats 36, can be simple mechanical flapper valves that open as the floats move upwardly under the force of excess fluids. Some moisture condensation from cargo is inevitable, and while some liquid is desirable to maintain the humidity at such levels, excessive water could damage the cargo and therefore should be removed. Further, some cargoes are preferably transported dry and keep best with a low humidity. In these circumstances the same container could be employed but with the drain valves held open so that water is removed as soon as it collects.

In the partially broken away section, the sub-floor duct system is shown resulting from the utilization of the T-shaped members 26 in fabricating the container floor 24. As shown, the top flanges of the T members 26 form a level column defined by the upright members of adjacent T member 26. The slots 28 permit the upward flow of conditioned air through the cargo.

FIG. 5b illustrates an alternative floor configuration wherein a conventional, flat floor 72 is employed in combination with pallets 74, which, in combination with the cargo, create a series of air ducts underneath the load. While the preferred embodiments of the present invention employ the special floor illustrated in FIG. 5a, the design philosophy of the present invention might also employ, with somewhat less efficiency, but with no loss in efficacy, either conventional pallets (not shown) or special pallets 74, which include vertical, longitudinal, reinforcing members 76 which define air flow channels beneath the support surface of the pallet.

Even conventional, wooden pallets can be employed, assuming that there is adequate open area beneath the supporting surfaces to function as an air duct to communicate pressurized conditioned air from the bulkhead wall through the floor of the container 10. If the air circulating fans have a sufficient capacity for movement of air, it would seem that the volume of the container 10 is sufficiently small so that, notwithstanding limited imbalances in circulation, the entire load will be adequately cooled. This would be especially so since the temperature of the circulating air is held rather closely to the preset, desired temperature.

FIG. 5c is an enlarged fragmentary view of a portion of the floor 24 with a typical shipping box 40 placed thereon. As can be seen, the box 40 includes a plurality of apertures 62 which facilitates the flow of air through the contents of the box 40.

The details of the T-section floor can be better appreciated from FIG. 5c, where the placement of the T-shape members 26 shows the plurality of ducts or passages 64 which are defined by adjacent T-shaped members 26. As is shown, the incoming air travels through the ducts 64 and then, since moist air is generally lighter than dry air, and since a pressure differential is created between the top of the container and the floor of the container, the air flows upwards through the slots 28 and through the load. In alternative embodiments, the "T" floor may be replaced by folded floor racks of extruded metal. Yet other embodiments might employ a conventional floor with the cargo supported on suitably apertured pallets which would permit circulation of air through the cargo.

The ends of the floor section, together with the lower surface of the container 66, form a trough 68 into which liquid may flow. Liquid in the trough 68 is directed to the corners of the container where the float operated drain valves permit excess moisture to be discharged from the interior of the container 10.

Figure 6:
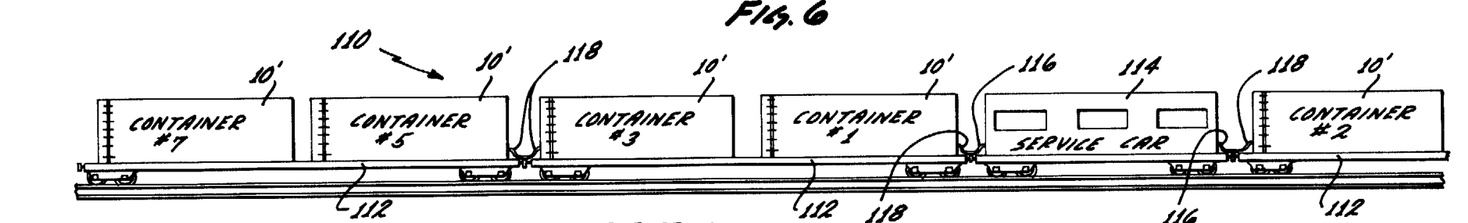
FIG. 6 is a block diagram showing a plurality of individual containers commonly connected to a central servicing and monitoring unit.

Turning next to FIG. 6, there is illustrated a system including a plurality of substantially self-contained refrigerated containers 10' shown, for example, in a container-train configuration 110. As shown, an arrangement is provided in which two containers are placed end-to-end on an individual flat car 112 and the flat cars make up a train, including a service car 114.

According to a preferred embodiment, the service car 114 includes a power supply which is capable of supplying electrical power to each of the containers on the train for operating the blowers, compressors, and the other ancillary air conditioning and circulating apparatus. In addition, the service car 114 is equipped with monitoring equipment which is coupled to the individual containers and to the sensors located therein.

Each container 10' is capable of being preset to maintain a different temperature according to the cargo carried by the container. Each container may, in a typical train, have a different perishable commodity and therefore would be preset to maintain a specific environment for that commodity.

A single cable 116 can extend from the service car 114 to the individual flat cars 112, and through appropriate car-to-car couplers, the cable can extend throughout the length of the train. Each flat car 112 would therefore include subsidiary cables 118 by which the individual container can be powered and receive and transmit signals to the service car 114.

It is noted that, whether a plurality of containers are placed on a train or otherwise accumulated in a single larger vehicle, such as a ship, the principle of a central power supply and communication system serving a plurality of containers is the same. Accordingly, the example of a train will be utilized with the understanding that the principles are equally applicable to any other mode of transportation, including ship.

Figure 7:
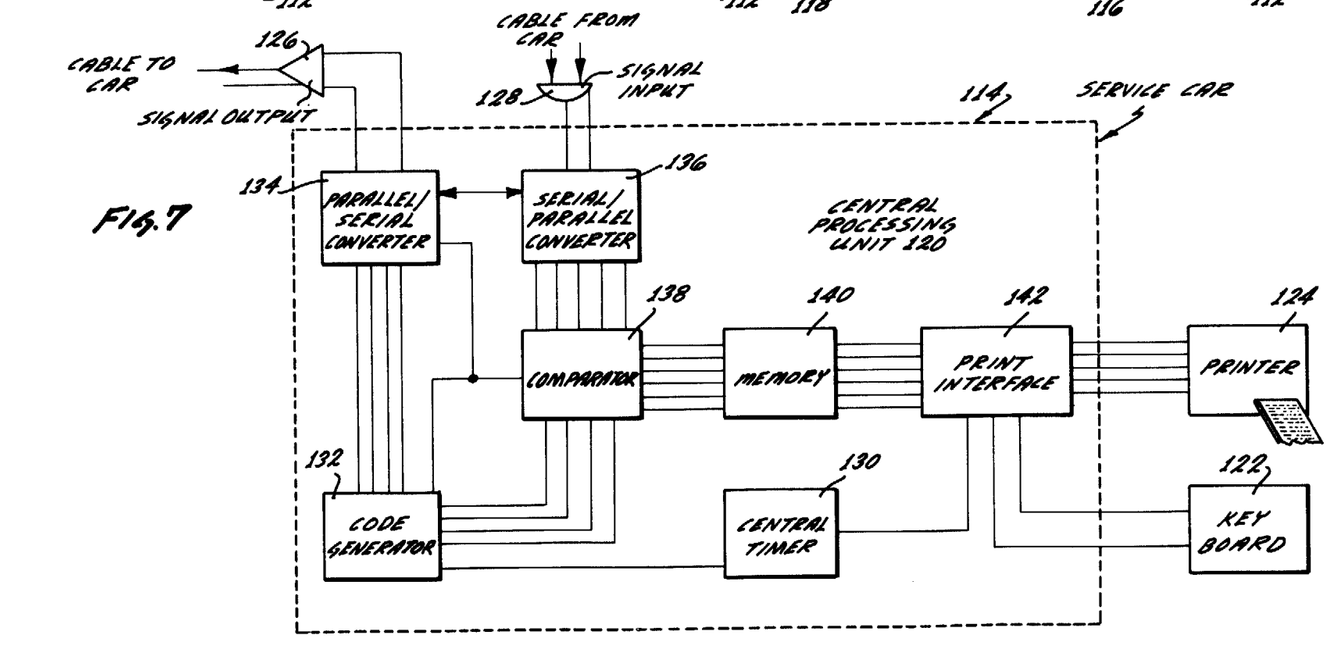
FIG. 7 is a block diagram of the monitor system located in the central service unit.

Turning next to FIG. 7, there is shown a block diagram of the electronic circuit that would be utilized for communicating information to and from the individual containers of the system. It is known that information can be modulated onto an AC power supply so that a single power cable could be used for communication as well. Alternatively, individual low voltage signal cables can physically accompany the higher voltage power cable throughout the train. It is merely a matter of design choice and, in a preferred embodiment, the signal information being communicated to and from the containers using the conductor that is primarily intended to transmit power.

As shown in the block diagram of FIG. 7, the primary element of the service car includes the central processing unit 120, an input keyboard 122, an output printer 124, a signal output device 126 intended to communicate with the container, and a signal input device 128 intended to receive information from the containers.

The central processing unit includes a central timer 130 which generates a plurality of timing pulses at a predetermined repetition rate. The timer 130 provides the basic clock for all other operations consistent including the scheduled interrogation of each of the containers on a regular basis. A code generator 132 can respond to such clock signals from the timer to generate a cyclical code corresponding to each container. As shown, a plurality of signal lines transmits a selected code, in parallel-to-serial converter 134 which converts the simultaneous signals on the several parallel input lines into a series of time organized signals on an appropriate output line. The parallel-to-serial converter 134 is coupled to a line driver amplifier, which is coupled through the communication line to the output device 126.

Similarly, serialized input signals are received in the receiving device 128 and are applied to a serial-to-parallel converter 136 which in turn applies its parallel output to a comparator 138. The comparator has, simultaneously applied to another set of input terminals, the output of the code generator 132 so that the address of the transmitting unit can be recognized as the address of the unit interrogated. Once the comparison has been affirmatively made, the address and the additional data are applied to a memory device 140 and from there to a print interface 142 which activates the printer and provides a permanent record of the information.

Figure 8:
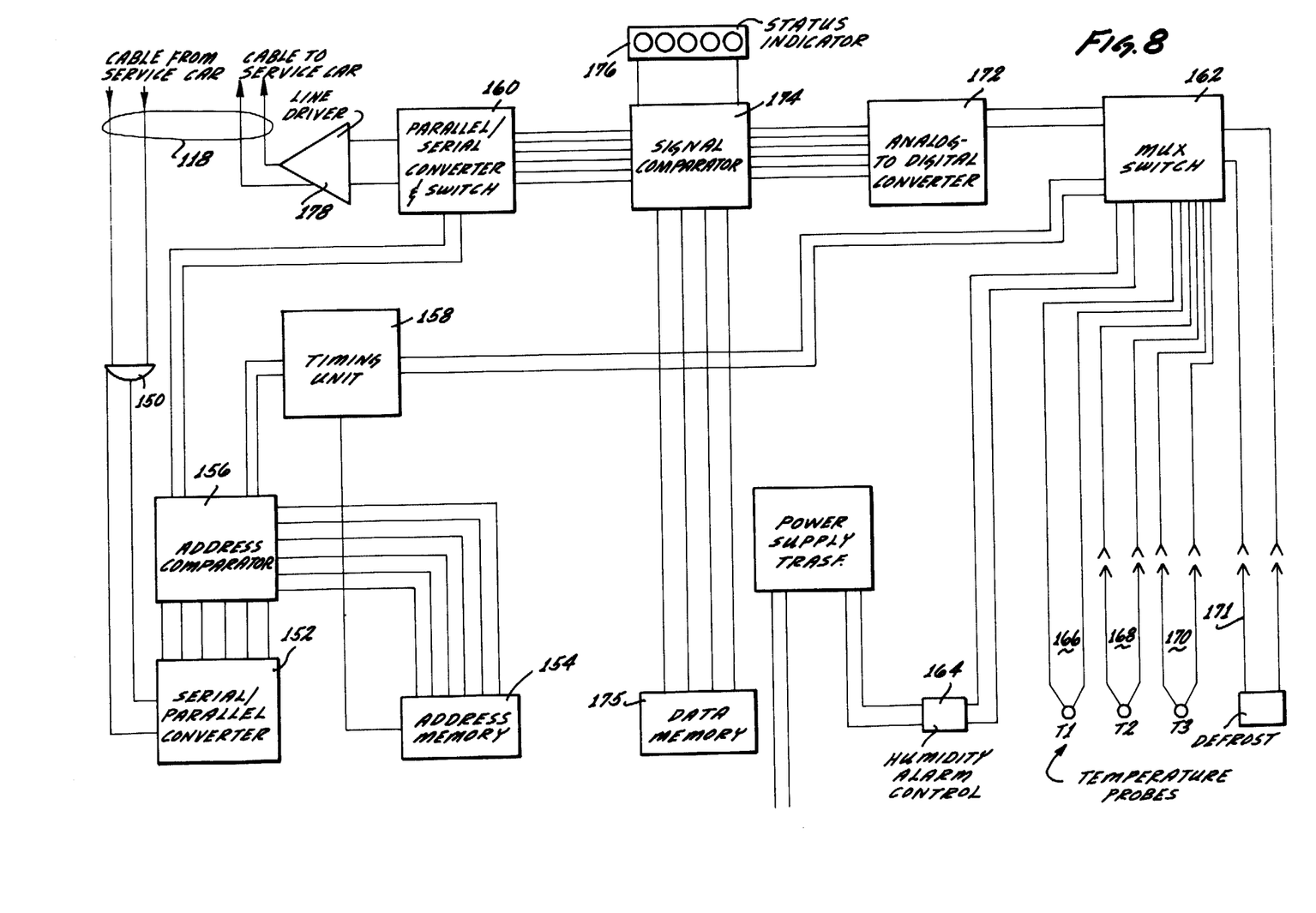
FIG. 8 is a block diagram of a portion of the monitoring system associated with each container.

In FIG. 8, the circuits within a typical container are also illustrated in block diagrammatic form. Signals from the service unit along cable 118 are applied to a container receiver 150 and are applied to a serial-to-parallel converter 152. An address memory 154 applies the container address to an address comparator 156, and if the received signal represents the address of the particular container, an enabling signal is supplied to a timing unit 158 and to a parallel-to-serial converter and switch 160.

A multiplexing switch 162 is then energized to interrogate the various analog sensors which, in the present example, include a humidity alarm control 164, and first, second, and third temperature probes 166, 168, 170. The first temperature probe T1 (166) is placed in the circulating air stream while the other two probes T2, T3 (168, 170) are placed within the product at predetermined locations within the container. A "defrost" signal can be supplied on a separate line which is connected to the timing circuits that control the defrosting cycle.

The output of the multiplex switch is applied to an analog-to-digital converter 172, which provides, on a plurality of output lines, the analog data from the sensors converted into digital information and applied to a signal comparator 174 which receives a second input from a data memory bank 176.

If the data information from the sensor is recognized as being equal to or greater than a limit stored within the memory, an alarm corresponding to that sensor is set. As shown, a visible status indicator 176 includes a group of lamps, each corresponding to a different sensor. When a lamp is lit, it signals an out of limit condition for the particular sensor and is intended to be visible to the maintenance crew of whatever vehicle is then transporting the container. The comparator also applies the output of the analog digital converter 172 to a parallel serial converter and switch 160 which converts parallel information into a series of pulses. The serialized information is applied to a line driver 178 and is then applied through the communication cable 118 to the service car 114.

In alternative embodiments, the status light 176 could operate in a fail safe mode in that only when conditions are within limits do the lights remain illuminated, and in an alarm state the lights are extinguished.

Yet other embodiments are available in which individual containers can have the particular cargo parameters preset as well as a special address preset at least for the journey. This information could either be entered through a portable keyboard, a panel of thumb wheel-type switches, or any other known input device. Similarly, each container may include a logging device which can maintain a permanent and continuous record with time of the conditions detected by the various sensors.

In general, most self-contained refrigeration units periodically undergo "defrost" cycles so that accumulated frost on the evaporator can be removed. During such cycles, alarms may be given which can be misleading. Accordingly, a signal indicating the defrosting cycle may be used either in conjunction with the other alarms or as a partial override to an alarm which is responding to the "defrost" operation. The sensors in the cargo itself may provide better information as to whether the information received during defrosting is useful or even reliable.

The particular hardware to be utilized in any embodiment or any application is strictly within the design choices available to a user and the record keeping needs of that user.

Turning now to FIG. 9, there is illustrated, by way of example, individual item of produce, which might be a pear or apple which is part of the bulk cargo being transported. The item of produce 190 has an internal temperature which is detected through the use of a temperature sensing probe 192 which is adapted to be connected to an appropriate connector on the container 194 through a conductor 196. The particular probe and article of produce is generally located within the load as indicated by reference numerals 60 and 58 in connection with FIG. 4, supra.

By constantly monitoring the temperature inside the product 190, it is possible to determine the efficiency and adequacy of the cooling system and the condition of the cargo as well.

Thus there has been described a new and improved method and apparatus for maintaining the storage conditions of perishable commodities and a system which can, with a central powering and monitoring unit, provide a plurality of semi-independent containers, each capable of maintaining a different commodity under optimum storage conditions for that commodity.

A capability for monitoring has been provided so that corrective action can be taken in the case of failures of equipment. Generally, corrective action, if taken early enough, such as repair or replacement of malfunctioning elements, will avoid damage to the perishables.

What is claimed as new is:

1. A method of maintaining field fresh perishable agriculture commodities in optimum condition during storage and transportation comprising the steps of:
   a. packing commodities in a chamber having a controllable environment;
   b. forcing temperature regulated, humidified air through the floor of said chamber and upwardly through said stored commodities;
   c. withdrawing air from the top of said chamber;
   d. sensing circulating air for temperature and humidity;
   e. circulating withdrawn air through heating, cooling, and humidifying means for altering the temperature and humidity thereof according to predetermined desired criteria;
   f. sensing the temperature of said packed commodities; and
   g. changing the predetermined desired criteria to achieve a desired optimum storage temperature of said commodities.

2. The method of claim 1 further including the steps of repeating steps (b) through (f) on a continuous basis.

3. The method of claim 1, above, wherein in said sensing step the temperature is sensed on air entering said chamber.

4. The method of claim 1, above, wherein in said sensing step the humidity is sensed at the entrance to said chamber.

5. The method of claim 1, above, wherein said step of sensing the temperature of said packed commodities includes the sensing of the temperature of the air circulating within the commodity cargo.

6. The method of claim 1, above, wherein said step of sensing the temperature of said packed commodities includes the sensing of the internal temperature of an individual commodity item.

7. The method of claim 1, above, wherein said predetermined desired criteria include a temperature differential of approximately 1° F. between the commodities and the circulating air.

8. The method of claim 1, above, wherein said predetermined desired criteria include a relative humidity of the recirculated air greater than 80%.

9. The method of claim 8, above, including the step of signalling if the relative humidity falls below 80%.

10. A method of maintaining field fresh perishable agriculture commodities in optimum condition during storage and transportation comprising the steps of:
   a. packing commodities in a chamber having a controllable environment;
   b. forcing temperature regulated, humidified air through the floor of said chamber and upwardly through said stored commodities;
   c. withdrawing air from the top of said chamber;
   d. sensing circulating air for temperature and humidity;
   e. circulating withdrawn air through heating, cooling, and humidifying means for altering the temperature and humidity thereof according to predetermined desired criteria;
   f. retaining a predetermined quantity of water in the floor of said chamber for affecting the humidity of recirculating air; and
   g. withdrawing excess water from the floor of said chamber.

11. A method of maintaining field fresh perishable agriculture commodities in optimum condition during storage and transportation comprising the steps of:
   a. packing commodities in a chamber having a controllable environment;
   b. forcing temperature regulated, humidified air through the floor of said chamber and upwardly through said stored commodities;
   c. withdrawing air from the top of said chamber;
   d. sensing circulating air for temperature and humidity;
   e. circulating withdrawn air through heating, cooling, and humidifying means for altering the temperature and humidity thereof according to predetermined desired criteria;
   f. sensing temperature exterior to said chamber; and
   g. modifying said predetermined criteria in accordance therewith.

12. The method of claim 11, above, wherein said circulating step includes heating if said exterior temperature sensing step indicates exterior temperatures that are colder than said predetermined desired criteria for said commodities.

* * * * *